(12) United States Patent
Hiramatsu (10) Patent No.: US 7,392,957 B2
(45) Date of Patent: Jul. 1, 2008

(54) SEATBELT RETRACTOR SYSTEM AND SEATBELT SYSTEM

(75) Inventor: Koji Hiramatsu, Tokyo (JP)

(73) Assignee: Takata Corporation, Tokyo (JP)

( * ) Notice: Subject to any disclaimer, the term of this patent is extended or adjusted under 35 U.S.C. 154(b) by 128 days.

(21) Appl. No.: 11/439,129

(22) Filed: May 24, 2006

(65) Prior Publication Data

US 2006/0208126 A1 Sep. 21, 2006

Related U.S. Application Data

(63) Continuation-in-part of application No. 10/815,935, filed on Apr. 2, 2004, now Pat. No. 7,152,824.

(30) Foreign Application Priority Data

| Apr. 15, 2003 | (JP) | ............................. 2003-110068 |
| Jul. 31, 2003 | (JP) | ............................. 2003-283373 |
| Dec. 12, 2003 | (JP) | ............................. 2003-414607 |
| Jun. 8, 2005 | (JP) | ............................. 2005-168739 |

(51) Int. Cl.
*B65H 75/48* (2006.01)

(52) U.S. Cl. ...................... 242/379.1; 242/382; 280/805

(58) Field of Classification Search ................. 242/374, 242/379.1, 381.1, 383.2, 383.5, 382; 280/805, 280/806; 297/472, 478

See application file for complete search history.

(56) References Cited

U.S. PATENT DOCUMENTS 4,323,205 A * 4/1982 Tsuge et al. ............. 242/379.1
5,779,176 A 7/1998 Hori et al.
6,216,972 B1 * 4/2001 Rohrle .................... 242/379.1
6,481,660 B2 * 11/2002 Nagata et al. ............ 242/379.1
6,568,621 B2 * 5/2003 Hiramatsu et al. ....... 242/379.1
2002/0050542 A1 * 5/2002 Nagata et al. ............ 242/379.1
2002/0084646 A1 * 7/2002 Klingauf et al. ............. 280/806
2003/0029954 A1 * 2/2003 Hori et al. ................ 242/379.1
2004/0206844 A1 10/2004 Shiotani et al.

FOREIGN PATENT DOCUMENTS

JP 2002-53007 1/2002

\* cited by examiner

*Primary Examiner*—Peter M. Cuomo
*Assistant Examiner*—Stefan Kruer
(74) *Attorney, Agent, or Firm*—Manabu Kanesaka

(57) ABSTRACT

A seatbelt retractor system allowing optimization of energy absorbing characteristics, includes a spool for retracting a seatbelt; a torsion bar made of a twistable material; a locking mechanism for stopping the rotation of the spool at least in a seatbelt withdrawing direction; a substantially disk shaped ring disposed in the inner periphery of an axial end of the spool; and a plastically deformable energy absorbing member. The energy absorbing member may have a substantially circular cross section. A first end of the energy absorbing member may be fixed to an outer periphery of the substantially disc-shaped ring, while a second end of the energy absorbing member may be detachably engaged with an inner periphery of the spool.

10 Claims, 10 Drawing Sheets

ENLARGED A PORTION

Fig. 14

SEATBELT RETRACTOR SYSTEM AND SEATBELT SYSTEM

CROSS-REFERENCE TO RELATED APPLICATION

This is a continuation in part application of Ser. No. 10/815,935 filed on Apr. 2, 2004 now U.S. Pat. No. 7,152,824.

BACKGROUND OF THE INVENTION AND RELATED ART STATEMENT

The present invention relates to a seatbelt retractor system for retracting the webbing of a seatbelt and, more particularly, it relates to a seatbelt retractor system having an energy absorption mechanism (an EA mechanism) for absorbing an inertial energy applied to an occupant when restraining the movement of the occupant by locking the seatbelt in an emergency to a seatbelt system.

Seatbelt systems provided to vehicle seats are essential systems for ensuring the safety of occupant's bodies by restraining abrupt movement of the occupants due to acceleration generated at vehicle collision.

The seatbelt systems generally include a webbing (belt), a retractor system, a buckle unit and the like.

The retractor system winds the webbing around a winder (a bobbin or a spool) to retract it inward by a spring force, and in a collision at which an impact is applied, locks the withdrawal of the webbing from the winder to thereby restrain the body of an occupant who is abruptly moving forward with the locked webbing. However, when the forward movement of the occupant is abruptly retrained, an impact by the reaction of the restraining is applied to the chest of the occupant and so on via the webbing. A method for energy absorption (hereinafter, referred to as "EA" as appropriate) has already been known to reduce the impact to the occupant. In a method disclosed by Japanese Patent No. 2875505, the collision energy applied to the occupant is absorbed in such a manner that a predetermined tensile load of the webbing is maintained while a larger withdrawing resistance than a fixed value is being applied to the webbing shortly after locking, and in this state, the webbing is withdrawn by a predetermined length.

The system of this conventional technique includes: a shaft disposed in a spool for winding the webbing in such a manner as to rotate relative to the spool; a locking mechanism that can lock the withdrawal of the webbing by stopping the rotation of the shaft; and a plastically deformable energy absorbing member (EA plate) disposed between the inner periphery of the spool and the outer periphery of the shaft. When the shaft is locked not to rotate by the locking mechanism in an emergency, the tension of the webbing that retrains the occupant who is moving forward by an inertial force acts as a turning force of the spool for winding the webbing relative to the shaft in the webbing withdrawing direction. When the relative turning force exceeds a fixed value, the EA plate is wound around the outer periphery of the shaft in the webbing withdrawing direction while being plastically deformed, thus absorbing the collision energy by the plastic deformation resistance, at that time. Accordingly, the spool rotates gradually whereas the locking mechanism is working, to withdraw the webbing while applying a fixed tension or more to the webbing, thereby reducing the force applied between the webbing and the occupant's body (see Japanese Patent No. 2875505 (Paragraph Nos. 53 to 60, FIGS. 7 and 8).

The above-described conventional technique, however, has the following problems.

In general, an impact at a collision depends on the structure of a vehicle. Accordingly, for sufficient protection of an occupant's body, it is necessary to optimize energy absorbing characteristics such as a set load (i.e., energy absorbing load; webbing tension at which absorption of energy is started) at which the energy absorbing mechanism starts operation and the amount of deformation when an impact is absorbed (i.e., webbing withdrawing stroke) and the like. As a result, flexibility and high design freedom for varying energy absorbing characteristics have been required for the entire retractor systems.

The foregoing conventional technique does not particularly consider changing of impact energy that the EA plate can absorb, and discloses no specific arrangement and principle of the changing. As a result, it was difficult to respond to the need for optimization of energy absorbing characteristics.

Since the EA plate has a specified width, the spool incorporating it increases in length, causing the obstruction to reduction of the size of the system.

Accordingly, it is an object of the invention to provide a seatbelt retractor system in which the energy absorbing characteristics can easily be optimized in response to the recent needs and which can be reduced in size, and a seatbelt system having the same.

Further objects and advantages of the invention will be apparent from the following description of the invention.

SUMMARY OF THE INVENTION

In order to achieve the above object, a first aspect of the invention includes: a substantially cylindrical rotatable member for retracting a seatbelt; a twistable shaft member disposed in the inner periphery of the substantially cylindrical member, in which a first axial end of the shaft member is connected to the substantially cylindrical member in such a manner as to rotate therewith; a mounting member disposed in the inner periphery of an axial end of the substantially cylindrical member and connected to the outer periphery of a second axial end of the shaft member in such a manner as to rotate therewith; a locking mechanism capable of stopping the rotation of the mounting member in a seatbelt withdrawing direction; and an energy absorbing member in substantially a rod shape of a substantially circular cross section, in which a first end of the energy absorbing member is fixed to the outer periphery of the mounting member and a second end of the energy absorbing member is in engagement with the inner periphery of the axial end of the substantially cylindrical member. The energy absorbing member absorbs an impact load applied to the seatbelt when the locking mechanism is activated.

When the rotation of the mounting member in the belt withdrawing direction is stopped by the locking member in an emergency, the tension of the seatbelt (webbing) that restrains the occupant who is going to move forward by an inertial force serves as a rotational force of the substantially cylindrical member relative to the shaft member in the seatbelt withdrawing direction. Here, according to the first invention, the shaft member is twistable. Accordingly, for example, when the relative rotation exceeds a specified amount, the shaft member is first plastically deformed by the torsion due to the relative rotation to absorb the collision energy by the plastic deformation resistance at that time. With the action, the energy absorbing member disposed between the mounting member and the substantially cylindrical member which rotate relative to each other is wound around the outer periphery of the mounting member in the webbing withdrawing direction while being plastically deformed, thus further absorbing the collision energy also by the plastic deformation resistance at that time. In this way, both of the plastic deformation of the shaft member and the plastic deformation of the plate member function as an energy absorbing mechanism, in which the entire energy absorbing load is the sum of the energy absorbing load when the shaft member is twisted and the energy absorbing load when the energy absorbing member winds around the outer periphery of the mounting member.

At that time, the amount of the energy absorbing load and the energy absorbing region can be varied by changing the material, thickness and so on of the shaft member. Particularly, for the energy absorbing member, the amount of the energy absorbing load and the energy absorbing region can be varied more easily. Specifically speaking, (a) the load can be decreased (or increased) by increasing (or decreasing) the radial length of a ring-shaped space formed between the outer periphery of the mounting member and the inner periphery of the axial end of the substantially cylindrical member. (b) The load can be increased (or decreased) by increasing (or decreasing) the thickness of the energy absorbing member. (c) The load characteristics can be changed by circumferentially changing the engaging position for the second end of the energy absorbing member in the inner periphery of the axial end of the substantially cylindrical member to thereby vary the relative rotation stroke characteristic during the winding.

Here, it is difficult for the known structure having the EA plate between the inner periphery of the spool and the outer periphery of the shaft to change the load on the EA plate by the above-describe methods.

With the known structure in which the EA plate is disposed directly on the outer periphery in the axial center of the shaft, that is, the EA plate is disposed in a very narrow space between the shaft and the spool. Accordingly, it is difficult to increase the radial length of the ring-shaped space between the shaft outer periphery and the spool inner periphery unlike (a).

In contrast, with the first aspect of invention, the first end of the plate member is fixed not to the shaft member itself but to the outer periphery of the mounting member, which is disposed separately around the outer periphery of the second axial end of the shaft member, and the second end of the plate member is in engagement not with the axial center but with the inner periphery of the axial end of the substantially cylindrical member. Thus, the radial length of the ring-shaped space can easily be varied separately from the diameter of the shaft member by relatively freely changing the outer diameter of the mounting member.

With the known structure, there is little space for increasing the thickness of the EA plate unlike (b), because of the limitation that the ring-shaped space itself cannot be increased in size. (Increasing the thickness in narrow space makes it difficult to wind the seatbelt while plastically deforming.) In contrast, according to a first aspect, the radial length of the ring-shaped space can be freely set, as described above. Accordingly, the thickness of the plate member can easily be increased.

With the known structure, the EA plate is in engagement with the inner periphery of the spool in the axial center. However, the axial center of the spool is a portion for retracting the webbing, so that a webbing-end engaging structure is provided at a circumferential portion of the spool. (Refer to FIG. 7 Japanese Patent No. 2875505). Accordingly, even in an attempt to circumferentially change the EA-plate engaging position in the spool inner periphery as described in (c), there is a limitation that it can be set only in a portion except the position where the webbing-end engaging structure is disposed. In contrast, the first embodiment of the retractor system comprises a structure in which the plate member is in engagement with the side of the substantially cylindrical member adjacent to the axial end. Accordingly, the EA plate is located in a position axially different from the webbing engaging position, enabling free setting without the limitation in circumferential position.

As has been described, according to the first aspect of the present disclosure, the amount of the energy absorbing load and the energy absorbing region can easily be changed by, for example, varying the radial length of the ring-shaped space between the outer periphery of the mounting member and the inner periphery of the substantially cylindrical member, the thickness of the energy absorbing member, the engaging position of the energy absorbing member in the inner periphery of the axial end of the substantially cylindrical member and so on. Thus, the energy absorbing characteristics of the entire retractor system can easily be changed also in combination with the various form of energy absorption shared by the shaft member and the substantially cylindrical member. This arrangement facilitates optimization of the energy absorbing characteristics according to the difference in vehicle structure in response to recent needs, thus protecting the body of an occupant sufficiently.

In order to achieve the above object, a second aspect includes a substantially cylindrical rotatable member for retracting a seatbelt; a twistable shaft member disposed in the inner periphery of the substantially cylindrical member, in which a first axial end of the shaft member is connected to the substantially cylindrical member in such a manner as to rotate therewith; a mounting member disposed in the inner periphery of an axial end of the substantially cylindrical member and connected to the outer periphery of a second axial end of the shaft member in such a manner as to rotate therewith; a locking mechanism capable of stopping the rotation of the mounting member in a seatbelt withdrawing direction; and an energy absorbing member in substantially a rod shape of a substantially flat cross section with curved corners or a substantially elliptical cross section, in which a first end of the energy absorbing member is fixed to the outer periphery of the mounting member and a second end of the energy absorbing member is in engagement with the inner periphery of the axial end of the substantially cylindrical member. The energy absorbing member absorbs an impact load applied to the seatbelt when the locking mechanism is activated.

Adopting an energy absorbing member that does not have a substantially circular shape of point symmetry, but has a flattened substantially flat shape or elliptical shape facilitates controlling the energy absorbing characteristics more finely by controlling the flatness of the flat shape and the proportion of the major axis to the minor axis of the ellipse.

According to a third aspect, in the second aspect, the energy absorbing member has substantially a rod shape of a substantially flat cross section with curved corners or a substantially elliptical cross section, in which the energy absorbing member is made of substantially a rod base material of a substantially circular cross section which is subjected to predetermined flattening process.

Flattening the base material enables the substantially flat or elliptical cross section to be achieved easily and reliably.

According to a fourth aspect, in the second or third aspect, the energy absorbing member has a flatness of the flat shape or a proportion of the major axis to the minor axis of the ellipse determined for desired energy absorbing characteristics.

This arrangement provides desired energy absorbing characteristics reliably.

According to a fifth aspect, the energy absorbing member, in any of the first to fourth aspects, has a tapered portion that decreases in thickness closer to the end.

Since the strength of the energy absorbing member is smaller at the tapered portion than that of the other part, when the energy absorbing member is winding around the outer periphery of the mounting member from an end while being plastically deformed, the load necessary for plastic deformation becomes lower than before. Therefore, the energy absorbing load can be made lower than before, so that smooth energy absorbing characteristics can be provided.

According to a sixth aspect, the tapered portion of the energy absorbing member of the fifth aspect is made of substantially a rod material of a substantially even cross section subjected to a specified flattening process.

This arrangement can provide an energy absorbing member of a shape smoother than that of a sharp pointed shape (tapered end) which is formed of substantially a rod material having a substantially even cross section whose end is cut, thus providing smooth energy absorbing characteristics.

In order to achieve the above object, the seventh aspect provides a seatbelt system including: a seatbelt for restraining an occupant; a seatbelt retractor system withdrawably retracting one end of the seat belt; a tongue provided to the seatbelt; and a buckle unit that comes into engagement with the tongue so that the occupant wears the seatbelt.

According to the seventh aspect, as in the first aspect, the amount of the energy absorbing load and the energy absorbing region can easily be changed, for example, by varying the radial length of the ring-shaped space between the outer periphery of the mounting member and the inner periphery of the substantially cylindrical member, the thickness of the energy absorbing member, the engaging position of the energy absorbing member in the inner periphery of the axial end of the substantially cylindrical member and so on. Thus, the energy absorbing characteristics of the entire retractor system can easily be changed in combination with the various forms of energy absorption shared by the shaft member and the substantially cylindrical member. This arrangement facilitates optimization of the energy absorbing characteristics according to the difference in vehicle structure in response to recent needs, thereby protecting the body of an occupant sufficiently.

According to the disclosed aspects, the energy absorbing characteristics of the entire retractor system can easily be varied. This arrangement facilitates optimization of the energy absorbing characteristics according to the difference in vehicle structure in response to recent needs, thus protecting the body of an occupant sufficiently. The use of the energy absorbing member having a substantially circular cross section eliminates the need for increasing the thickness of the mounting member, thus providing a compact system.

DETAILED DESCRIPTION OF PREFERRED EMBODIMENTS

Embodiments of the present invention will be described with reference to the drawings.

Figure 1:
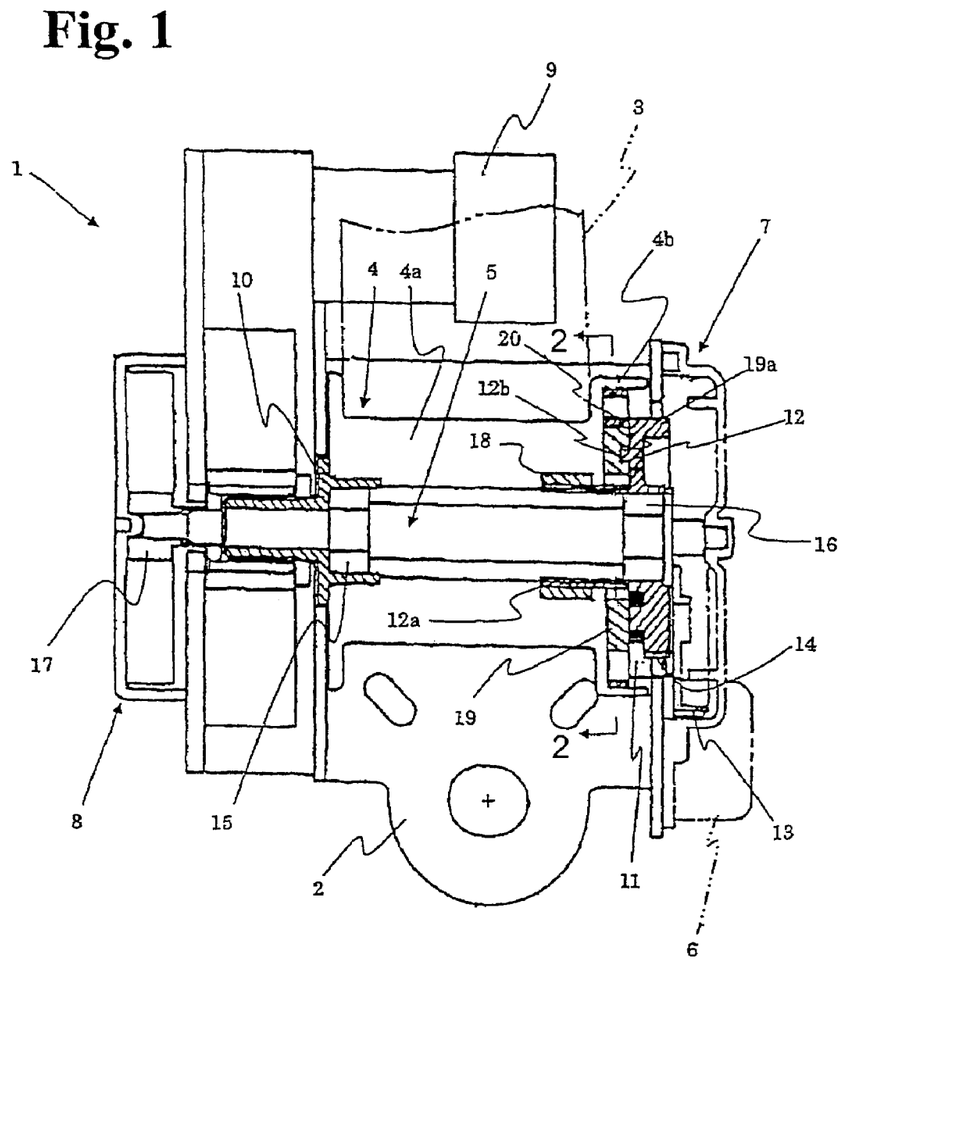
FIG. 1 is a schematic longitudinal sectional view of the entire structure of a seatbelt retractor system according to an embodiment of the present invention.

FIG. 1 is a schematic longitudinal sectional view of the entire structure of a seatbelt retractor system according to the embodiment.

Referring to FIG. 1, the retractor system 1 includes a frame 2; a spool (substantially cylindrical member) 4 for retracting a seatbelt 3; a torsion bar 5 (shaft member) made of a twistable material; a deceleration sensing means 6 that is activated by sensing a large vehicle deceleration generated in an emergency; a locking mechanism 7 that stops the rotation of the spool 4 at least in a belt withdrawing direction; a spring means 8 having a spiral spring (not shown); a pretensioner 9 that is activated in an emergency to generate a belt retracting torque; and a bush 10 that transmits the seatbelt retracting torque of the pretensioner 9 to the spool 4.

The locking mechanism 7 includes a locking base 12 that holds a pawl 11 in such a manner as to rock, and a lock gear 13. The lock gear 13, which is not shown because it is known, rotates with the torsion bar 5 in a normal state. In an emergency, the lock gear 13 stops by the activation of the deceleration sensing means 6 to generate a relative rotation difference from the torsion bar 5, thereby bringing the pawl 11 into engagement with an internal gear 14 on the sidewall of the frame 2. As a result, the rotation of the locking base 12 (or the spool 4) in the seatbelt withdrawing direction is stopped. Also during the abrupt withdrawal of the seatbelt 3, which is not shown, the locking base 12 of the locking mechanism 7 rotates relative to the lock gear 13 in the seatbelt withdrawing direction, thereby obstructing the withdrawal of the seatbelt 3 as in the above.

The torsion bar 5 is disposed with play in such a manner as to axially pass through the inner periphery (specifically, the radial center) of the spool 4. The torsion bar 5 includes a torque transmitting portion (a second torque transmitting portion) 15 disposed at a first axial end of the torsion bar 5 (on the left in FIG. 1) and in engagement with a second axial end of the spool 4 in such a manner as not to rotate relative thereto and a torque transmitting portion (a first torque transmitting portion) 16 located at a second axial end of the torsion bar 5 (on the right in FIG. 1) and in engagement with the locking base 12 so as not to rotate relative thereto (in other words, which is supported by the rocking base 12 in such a manner as to rotate therewith. The torsion bar 5 functions to rotationally connect the spool 4 and the locking mechanism 7 with each other.

The spool 4 includes a body cylinder 4a that retracts the seatbelt 3 and a large-diameter cylindrical part 4b having an outside diameter larger than that of the body cylinder 4a, and is supported rotatably between the both sidewalls of the frame 2. The spool 4 is constantly biased in the seatbelt retracting direction by the spring force of the spiral spring of the spring means 8 via a bush 17, the torsion bar 5, the second torque transmitting portion 15 of the torsion bar 5, and the bush 10. With this arrangement, the first axial end of the torsion bar 5 (the left in FIG. 1) connects with the spool 4 so as to rotate therewith. When the pretensioner 9 is activated, the belt retracting torque generated in the pretensioner 9 is transmitted to the spool 4 via the bush 10, whereby the spool 4 retracts the seatbelt 3 by a specified amount.

Between the spool 4 and a shaft 12a of the locking base 12 is disposed an annular relative-rotation locking member 18. The relative-rotation locking member 18 has a internal thread on the inner periphery (not shown), with which the relative-rotation locking member 18 is screwed on the external thread (not shown) of the locking base shaft 12a, and is fitted in the axial hole of the spool 4 in such a manner as not to rotate relative thereto and but to move axially. When the spool 4 rotates relative to the locking base 12 in the belt withdrawing direction, the relative-rotation locking member 18 rotates with the spool 4 to move to the right in FIG. 1.

The most striking characteristic of the embodiment is that a ring 19 (mounting member) is provided around the inner periphery of the axial right end of the spool 4 in FIG. 1 and a plastically deformable energy absorbing member 20.

The ring 19 is of a substantially disc shape, and is disposed with play to allow the torsion bar 5 to axially pass through the radial center. The ring 19 connects to the outer periphery of the second axial end of the torsion bar 5 via the locking base 12 in such a manner as to rotate therewith by the engagement of an engaging recess 19a on the right of FIG. 1 (adjacent to the locking base 12) with an engaging protrusion 12b of the rocking base 12 on the left in FIG. 1.

Figure 2:
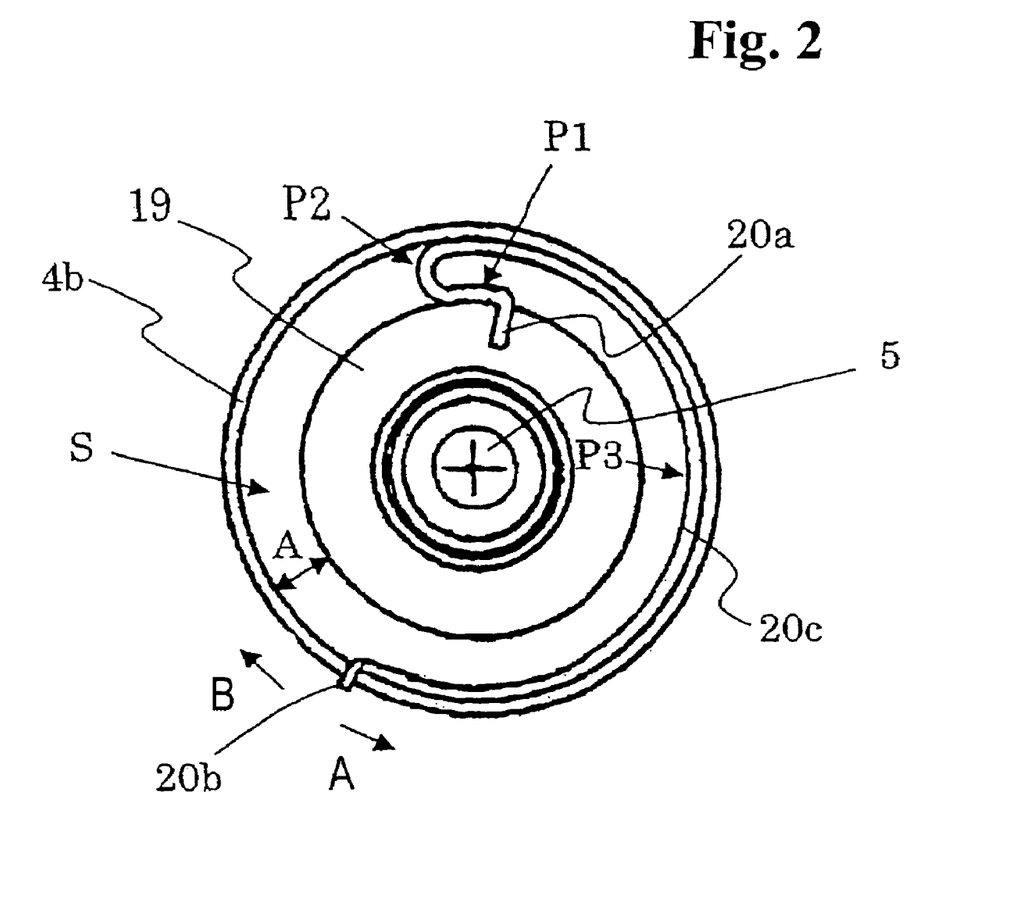
FIG. 2 is a cross sectional view of the detailed mounting structure for an energy absorbing member, taken along line 2-2 of FIG. 1.
Figure 3:
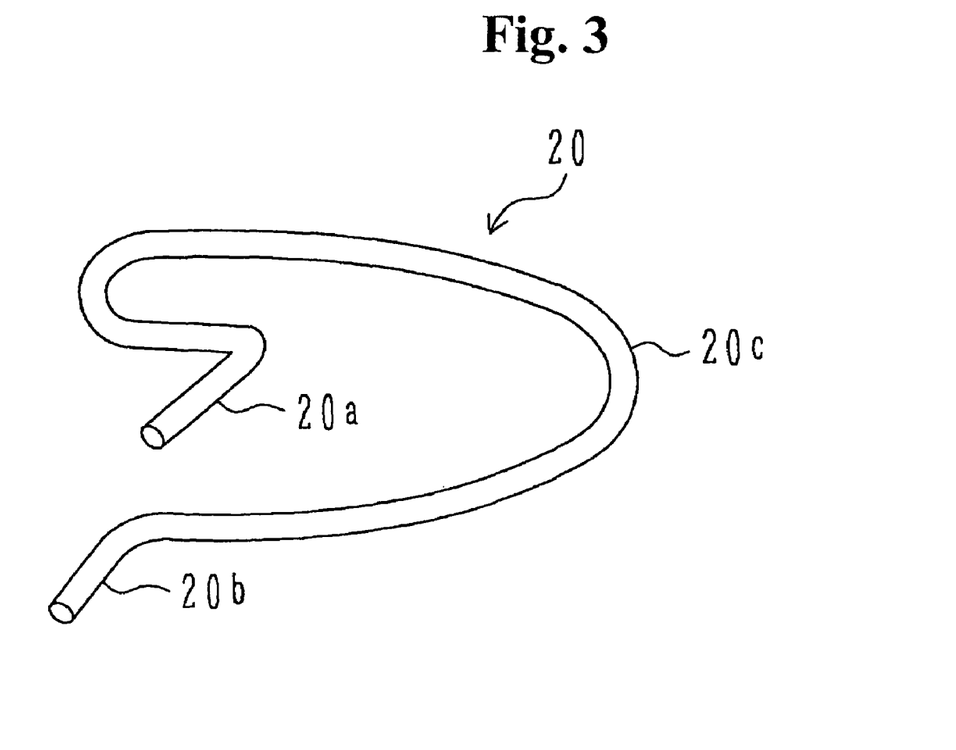
FIG. 3 is a perspective view of the energy absorbing member taken out in a mounted state.

FIG. 2 is a cross sectional view of the detailed mounting structure for the energy absorbing member 20, taken along line 2-2 of FIG. 1. FIG. 3 is a perspective view of the energy absorbing member 20 taken out in the mounted state.

Referring to FIGS. 2 and 3, the energy absorbing member 20 is a bent rod member having a substantially circular cross section. In the mounted state, a first end 20a (radially inner side of the ring 19 and the spool 4) is tightly secured to the outer periphery of the substantially disc shaped ring 19 by an appropriate way. On the other hand, a second end 20b (radially outer side of the ring 19 and the spool 4) detachably engages (specifically described later) with the inner periphery of the large-diameter cylindrical part 4b of the spool 4 (specifically, in such a manner as to pass through from the inner periphery to the outer periphery in this embodiment).

A middle portion 20c between the first end 20a and the second end 20b forms an outer periphery extending portion (P1 in FIG. 2) extending from the first end 20a along the outer periphery of the ring 19 in the unwinding direction (counter-clockwise in FIG. 2) of the seatbelt 3, and then forms a bent portion (P2 in FIG. 2) that turns back at 180 degrees in a ring-shaped space S which has a radial length A and is located between the outer periphery of the ring 19 and the inner periphery of the spool large-diameter cylindrical part 4b. After the turning back, the middle portion 20c extends along the inner periphery of the spool large-diameter cylindrical part 4b in the winding direction of the seatbelt 3 (clockwise in FIG. 2) to form an inner-periphery extending portion (P3 in FIG. 2), and reaches the second end 20b substantially opposite (at a circumferential angle of about 180 degrees in this embodiment) to the first end 20a with respect to the axial center.

Figure 4:
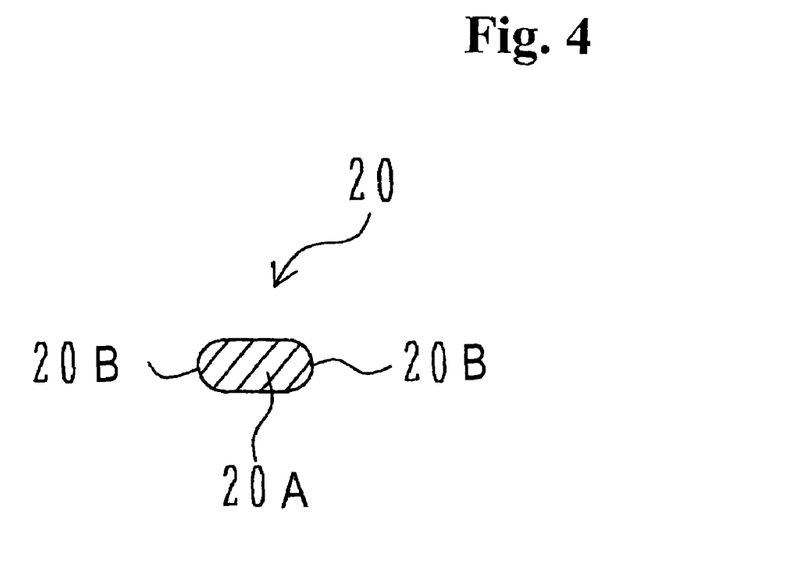
FIG. 4 is a diagram of the end face of an energy absorbing member of a modification.

Referring to FIG. 4, the energy absorbing member 20 may have a substantially flat cross section with curved corners or a substantially elliptical cross section. The energy absorbing member 20 is, e.g., made of a base material of a substantially circular cross section subjected to a predetermined flattening process (e.g., a process of squashing with a pair of rollers), and in this embodiment, it has what is called a track shape having curved portions 20B on both sides of the flat portion 20A. In this case, the degree of the flatness of the substantially flat shape (or the proportion of the major axis and the minor axis of the ellipse) can be determined according to desired energy absorbing characteristics for the energy absorbing member 20. The energy absorbing member 20 is disposed along the inner periphery of the spool large-diameter cylindrical part 4b, with the flat portion 20A oriented radially to the ring 19.

The operation of this retractor system 1 according to the embodiment will be described hereinbelow.

(1) In Normal State

When the seatbelt 3 is not worn, the seatbelt 3 is completely retracted by the biasing force of the spring means 8. When the seatbelt 3 is withdrawn for wearing at a normal speed, the spool 4 rotates in the seatbelt withdrawing direction to withdraw the seatbelt 3 smoothly. After a tongue (not shown), which is provided slidably to the withdrawn seatbelt 3, is inserted into a buckle (not shown) of a buckle unit attached to the vehicle, an excessively withdrawn portion of the seatbelt 3 is wound onto the spool 4 by the biasing force of the spring means 8, so that the seatbelt 3 is fitted to the occupant to the extent that the occupant feels no pressure.

(II) In Emergency

In an emergency, a seatbelt retracting torque generated by the pretensioner 9 is transmitted to the spool 4. The spool 4 retracts the seatbelt 3 by a specified amount to restrain the occupant quickly. Meanwhile, the deceleration sensing means 6 is activated by sensing high vehicle deceleration generated in an emergency to stop the rotation of the lock gear 13 in the seatbelt, withdrawing direction, whereby the pawl 11 of the locking mechanism 7 rotates to come into engagement with the internal gear 14 on the sidewall of the frame 2. The rotation of the locking base 12 and the torsion bar 5 in the seatbelt withdrawing direction is then stopped. Accordingly, the tension of the seatbelt 3 that restrains the occupant who is moving forward by an inertial force, serves as a rotational force of the spool 4 relative to the torsion bar 5 in the seatbelt withdrawing direction, whereby only the spool 4 rotates in the seatbelt withdrawing direction while twisting the torsion bar 5.

Thereafter, when the relative rotation exceeds a specified amount, the torsion bar 5 is plastically deformed by the torsion due to the relative rotation to absorb the collision energy by the plastic deformation resistance at that time. Accordingly, the energy absorbing member 20, disposed between the ring 19 that rotates with the locking base 12 and the spool 4 that rotates relative thereto, is wound around the outer periphery of the ring 19 in the seatbelt withdrawing direction while being plastically deformed, thus absorbing the collision energy by the plastic deformation resistance at that time.

Figure 5:
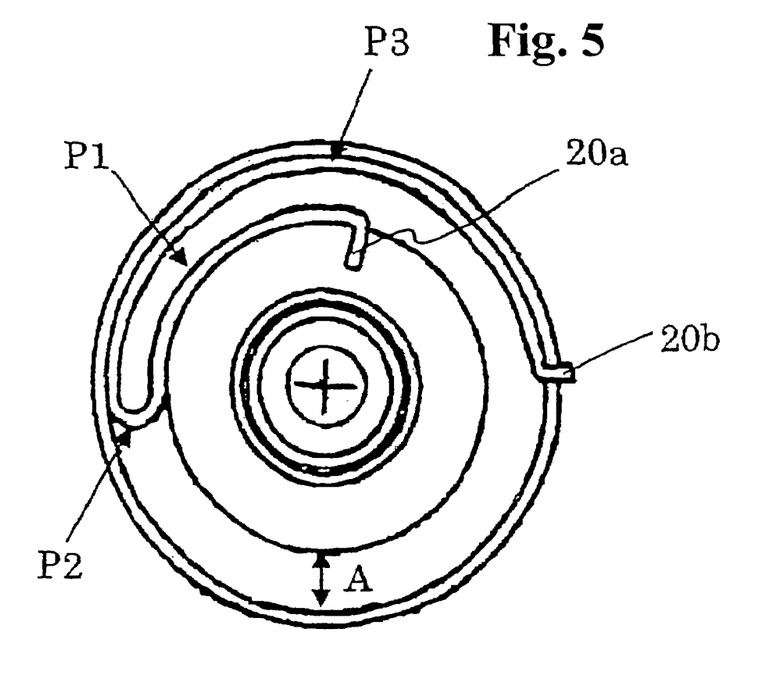
FIG. 5 is a diagram showing the behavior when a plate member is absorbing collision energy while being plastically deformed by the relative rotation of a spool and a torsion bar.

FIG. 5 is a diagram showing the behavior at that time (the torsional rotation displacement of the torsion bar 5 is not shown for the purpose of easy understanding). As illustrated, as the winding of the energy absorbing member 20 advances with the rotation of the spool 4 relative to the torsion bar 5 (counterclockwise in the figure), the outer periphery extending portion (P1) extending from the first end 20a along the outer periphery of the ring 19 in the withdrawing direction of the seatbelt 3 increases in length, so that the position of the bent portion (P2) that is turned back in the ring-shaped space S is shifted in the seatbelt withdrawing direction more than that in FIG. 2.

In other words, the portion of the greatest plastic deformation shifts successively in the seatbelt withdrawing direction. Correspondingly, the inner periphery extending portion (P3) extending along the inner periphery of the spool large-diameter cylindrical part 4b decreases in length in the retracting direction of the seatbelt 3 to decrease the circumferential angle defined by the first end 20a and the second end 20b.

Figure 6:
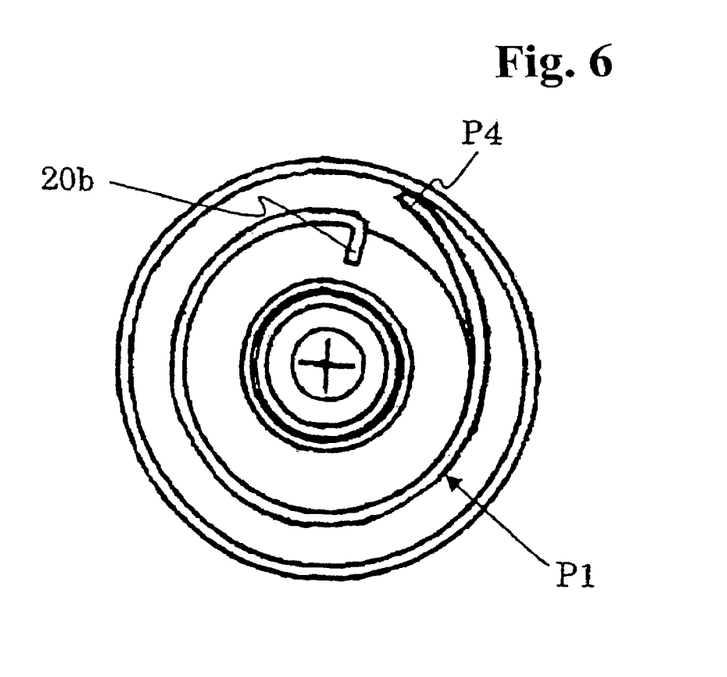
FIG. 6 is a diagram showing the behavior when the relative rotation of the spool and the torsion bar advances, so that the plate member comes off the spool.

FIG. 6 is a diagram showing a state in which the relative rotation has advanced (similarly, the torsional rotation displacement of the torsion bar 5 is not shown). As illustrated, as the winding of the energy absorbing member 20 advances with the rotation of the spool 4 relative to the torsion bar 5 (counterclockwise in the figure), the outer periphery extending portion (P1) extending from the first end 20a along the outer periphery of the ring 19 in the withdrawing direction of the seatbelt 3 increases further in length, whereby the second end 20b comes out of engagement with the inner periphery of the spool large-diameter cylindrical part 4b to come off the large-diameter cylindrical part 4b and forms a free end (P4). (The bent portion P2 and the inner-periphery extending portion P3 disappear.)

During the rotation of the spool 4 relative to the torsion bar 5 in the seatbelt withdrawing direction while twisting the torsion bar 5, both of the plastic deformation of the torsion bar 5 and the plastic deformation of the energy absorbing member 20 serve as an energy absorbing mechanism (EA mechanism), in which the entire energy absorbing load is the sum of the energy absorbing load when the torsion bar 5 is twisted and the energy absorbing load when the energy absorbing member 20 winds around the outer periphery of the ring 19 (mounting member). The torsional torque during the plastic deformation of the torsion bar 5 and the plastic deformation of the energy absorbing member 20 enable the impact energy to the occupant to be absorbed, thus limiting the load applied to the seatbelt 3.

Figure 7:
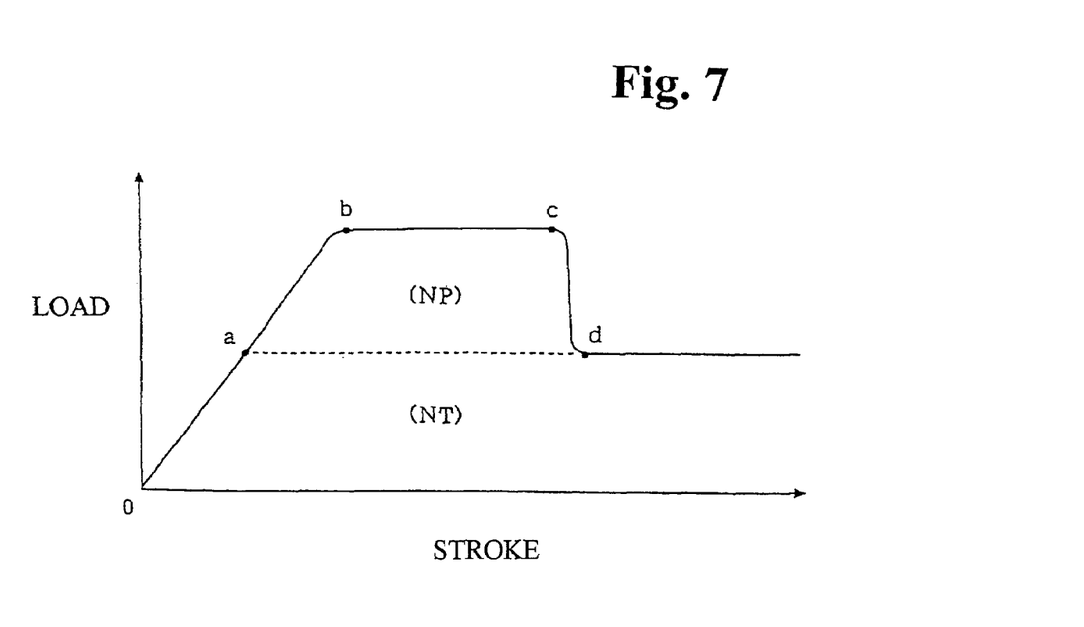
FIG. 7 is a diagram showing the behavior of the EA load when an EA mechanism including a torsion bar and a plate member absorbs collision energy.

FIG. 7 is a diagram showing the behavior of the limit load of the EA mechanism (hereinafter, referred to as an EA load as appropriate) configured of the torsion bar 5 and the energy absorbing member 20 when the energy absorption is performed as described above. The horizontal axis indicates the stroke of the rotation of the spool 4 relative to the locking base 12.

Referring to FIG. 7, the value of the EA load is zero when the stroke of the rotation of the spool 4 relative to the locking base 12 is zero. Thereafter, when the relative rotation starts, so that the stroke increases, the EA load due to the torsion of the torsion bar 5 increases proportionally, as described above. Thereafter, when the stroke increases to a specified value (point a in FIG. 7), the plastic deformation of the energy absorbing member 20 starts in addition to the torsion of the torsion bar 5, as described above. Thus, the entire EA load becomes the sum of the EA load by the torsion bar 5 (NT in FIG. 7) and the EA load by the energy absorbing member 20 (NP in FIG. 7). When the stroke further increases, the total EA load of the entire retractor system 1 stops increasing from a specified value (point b in FIG. 7), maintaining a specified value even if the stroke increases (points b to c in FIG. 7). The state shown in FIG. 5 corresponds to this state.

When the stroke further increases, so that the second end 20b of the plate member comes out of engagement with the spool large-diameter cylindrical part 4b (refer to FIG. 6), the EA load by the energy absorbing member 20 disappears, so that the EA load of the entire retractor system 1 returns to only the EA load NT by the torsion bar 5, thereby decreasing abruptly (from point c to point d in FIG. 7). Thereafter, the EA load is maintained substantially constant at the decreased value even if the stroke increases (rightward from point d in FIG. 7).

In this embodiment, the stroke has an upper limit given by the relative-rotation locking member 18. Specifically speaking, as the spool 4 rotates relative to the locking base 12 in the belt withdrawing direction, the relative-rotation locking member 18 moves to the axial right in FIG. 1. When the relative-rotation locking member 18 has moved to the end of the external thread of the locking base 12, it cannot move more to the axial right, so that the rotation is locked to stop the rotation relative to the locking base 12. As a result, the spool 4 also stops the rotation relative to the locking base 12. In other words, the rotation of the spool 4 in the belt withdrawing direction is locked to disable the withdrawal of the seatbelt 3 and as such, the inertial movement of the occupant is prevented so that the occupant is protected by the seatbelt 3.

This embodiment provides the following advantages.

(1) Optimizing Energy Absorbing Characteristics

The embodiment facilitates changing the energy absorbing characteristics of the entire retractor system 1; specifically, easily optimizes the energy absorbing characteristics according to the difference in vehicle structure in response to recent needs. The advantages will be described with reference to FIGS. 8 to 10.

As has been described, with the retractor system 1 of the embodiment, the entire energy absorbing load during the relative rotation of the spool 4 in the seatbelt withdrawing direction while the torsion bar 5 is twisted is the sum of the energy absorbing load when the torsion bar 5 is twisted and the energy absorbing load when the energy absorbing member 20 winds around the outer periphery of the ring 19 (mounting member).

At that time, the amount of the energy absorbing load and the area of the energy absorption by the torsion bar 5 can be varied by changing the material, thickness and so on of the torsion bar 5. Particularly, the amount of the energy absorbing load and the area of the energy absorption by the energy absorbing member 20 can be varied more easily. A method therefore will be described in sequence.

(A) Setting Radial Length of Ring-shaped Space S

With the known structure in which the EA plate is disposed between the inner periphery of the spool and the outer periphery of the shaft, the EA plate is mounted directly to the outer periphery of the axial center of the shaft, that is, the EA plate is disposed in a very narrow space between the shaft and the spool. Accordingly, it is difficult to increase the radial length of the ring-shaped space between the shaft outer periphery and the spool inner periphery.

In contrast, with the retractor system 1 of the embodiment, the first end 20a of the energy absorbing member 20 is not fixed to the torsion bar 5 itself but to the outer periphery of the ring 19, which is disposed separately around the outer periphery of the second axial end of the torsion bar 5, and the second end 20b of the energy absorbing member 20 is in engagement not with the axial center but with the spool large-diameter cylindrical part 4b at the axial end of the spool 4. Thus, the radial length A of the ring-shaped space S can easily be varied separately from the diameter of the torsion bar 5 by relatively freely changing the outer diameter of the ring 19 (it is needless to say that the inner diameter of the spool large-diameter cylindrical part 4b may be changed). For example, when the radial length A of the ring-shaped space S is increased (or decreased, hereinafter, the correspondence also applies to the following), the curvature of the bent portion (P2) that turns back in the ring-shaped space S when the energy absorbing member 20 is plastically deformed by the relative rotation can be increased (or decreased), thus facilitating decreasing (or increasing) the EA load.

Figure 8:
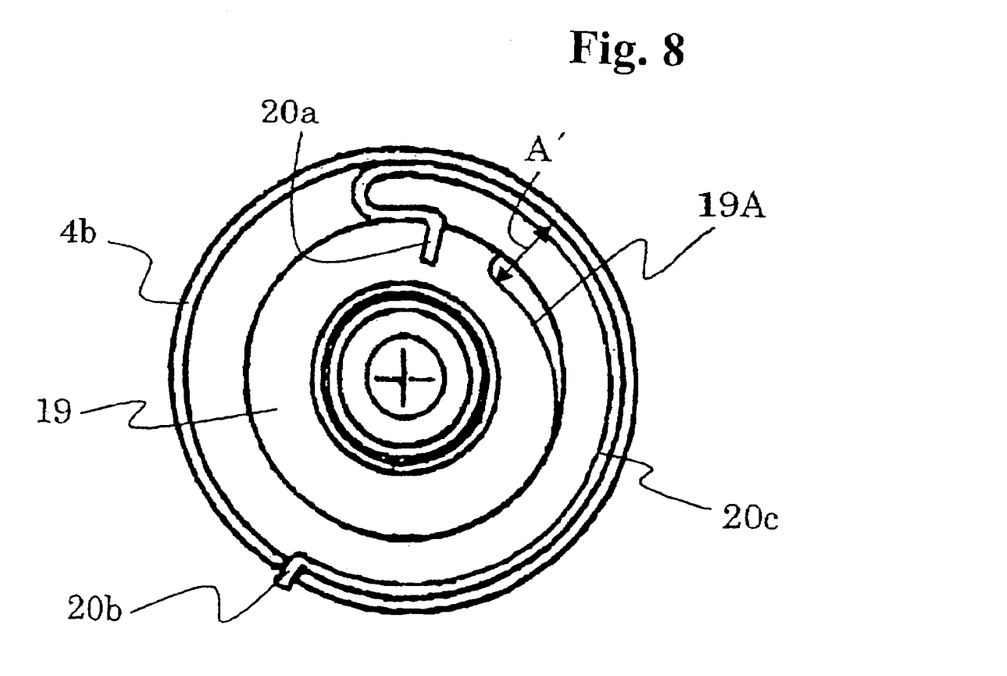
FIG. 8 is a diagram of an example of the setting of a radial length A of a ring-shaped space between a spool large-diameter cylindrical part and a ring.

FIG. 8 is a diagram showing an example of setting of the radial length A of the ring-shaped space S, which corresponds to FIG. 2. The same elements as those of FIG. 2 are given the same numerals and their description will be omitted. As shown in FIG. 8, the ring 19 has a small-diameter winding portion 19A of a recessed shape whose radius is smaller than the other part (alternatively, the entire axial length may be small in diameter). The small-diameter winding portion 19A increases in the distance from the spool large-diameter cylinder 4b as the energy absorbing member 20 winds therearound, whereby the EA load can be made lower than before.

Figure 9:
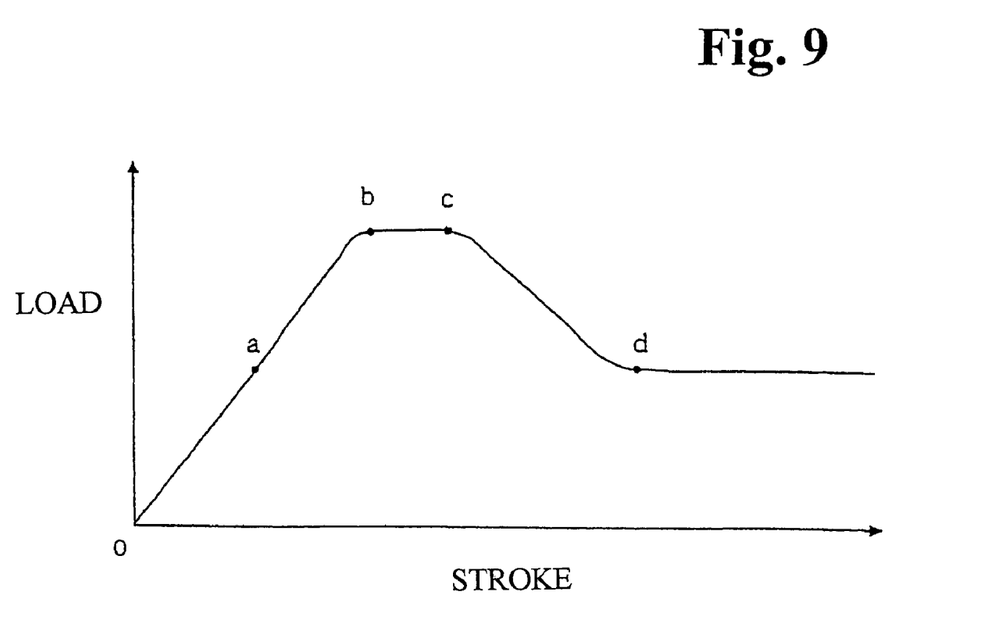
FIG. 9 is a diagram showing the behavior of the EA load when an EA mechanism including the torsion bar and the plate member absorbs collision energy in the example of FIG. 8.

FIG. 9 is a diagram showing the behavior of the EA load at that time, which corresponds to FIG. 7. The same elements as those of FIG. 7 are given the same numerals and their description will be omitted.

Referring to FIG. 9, the value of the EA load is the same as that of FIG. 7 before the energy absorbing member 20 winds around the small-diameter winding portion 19A. (Original O→point a→point b→point c.) As the stroke increases, so that the energy absorbing member 20 enters the small-diameter winding portion 19A (point c) to wind therearound, the distance from the spool large-diameter cylindrical part 4b increases gradually to a value larger than A (indicated by A' in FIG. 8). Therefore, the curvature of the bent portion (P2) when the energy absorbing member 20 is plastically deformed by the relative rotation can be increased gradually, so that the EA load can be decreased gradually (point c' and subsequent points in FIG. 9). Finally, the EA load reaches point d at which the second end 20b of the energy absorbing member 20 comes out of engagement with the spool large-diameter cylindrical part 4b.

(B) Setting Diameter etc. of Energy Absorbing Member 20

With the known structure, there is little space for increasing the thickness of the EA plate because of the limitation that the ring-shaped space itself cannot be increased in size. (Increasing the thickness in narrow space makes it difficult to wind the seatbelt while plastically deforming.)

In contrast, with the retractor system 1 of the embodiment, the radial length A of the ring-shaped space S can be set freely, as described in (A). Accordingly, the EA load can easily be increased by the increase of the diameter of the energy absorbing member 20 (the thickness of the flat portion 20A in the case of FIG. 4) to thereby increase the rigidity, and can also be decreased by the decrease of the thickness to reduce the rigidity.

Figure 10:
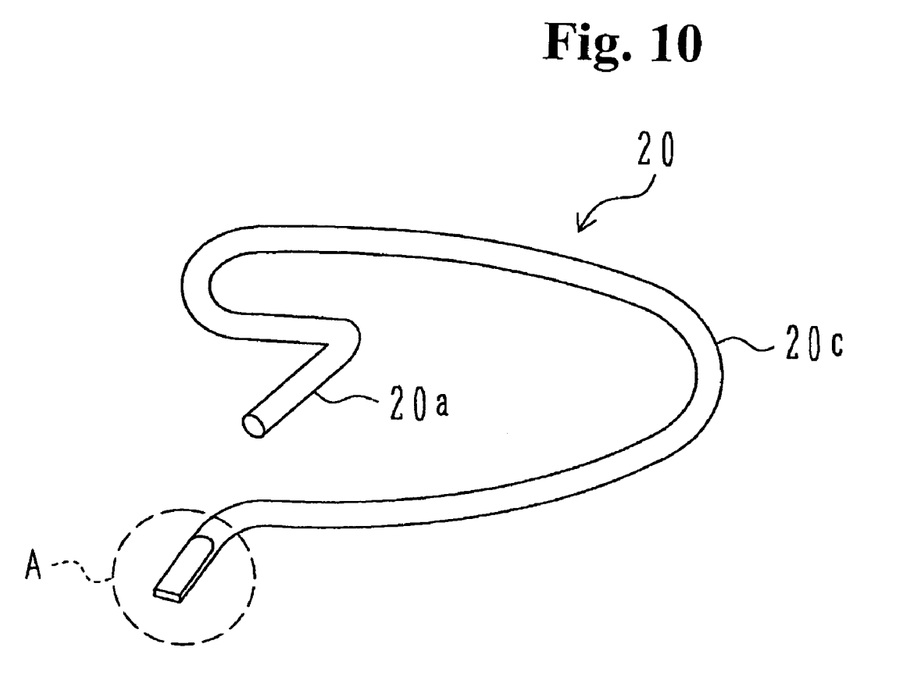
FIG. 10 shows an example of an energy absorbing member of a modification.
Figure 11:
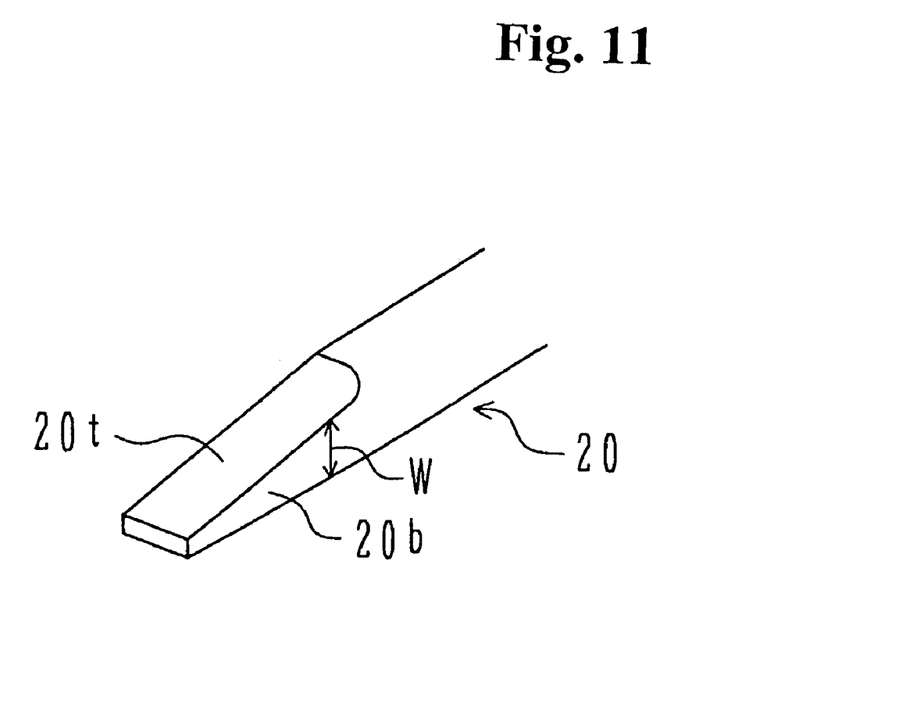
FIG. 11 is an enlarged view of the portion surrounded by the dotted frame A of FIG. 10.

Another method of setting the thickness of the energy absorbing member 20 by partially flattening the thickness is provided as a method similar to the rigid control by the setting of the diameter and plate thickness. FIG. 10 shows an example of the energy absorbing member 20 with this structure. In this example, the energy absorbing member 20 has a tapered portion 20t that decreases in thickness toward the end of the second end 20b (refer to FIG. 11). (The width of the second end 20b also decreases substantially, correspondingly). Since the strength of the energy absorbing member 20 is smaller at the tapered portion 20t than at the other part, the load necessary for plastic deformation becomes lower than before, when the energy absorbing member 20 is winding around the outer periphery of the ring 19 from the first end successively while being plastically deformed, as shown in FIG. 5. Therefore, the EA load can be made lower than before.

Particularly, in this example, the width W at the tapered portion 20t decreases gradually toward the second end 20b. This shape can be formed by application of a specified flattening process (e.g., a squashing process with a pair of rollers) to a substantial rod material of an approximately even cross section. Thus the energy absorbing characteristics are set as shown in FIG. 9 (in this case, points c' to d in FIG. 9 correspond to the tapered portion 20t).

(C) Setting Engaging Position for Plate-Member Second End 20b

With the known structure, the EA plate is in engagement with the axial center of the inner periphery of the spool. However, the axial center of the spool is a portion for retracting the webbing, so that a webbing-end engaging structure is provided at a region of the circumference of the spool (refer to FIG. 7 of Patent Document 1). Accordingly, even in an attempt to circumferentially change the EA-plate engaging position in the spool inner periphery, there is a limitation that it can be set only in a portion except the position where the webbing-end engaging structure is disposed.

In contrast, the retractor system 1 of the embodiment has a structure in which the energy absorbing member 20 is in engagement with the large-diameter cylindrical part 4b of the spool 4 adjacent to the axial end. Accordingly, the energy absorbing member 20 is located in a position axially different from the webbing engaging position. This enables free setting without the limitation in circumferential position. Therefore, for example, the energy absorbing region (horizontal axis) shown in FIGS. 7 and 9 can be decreased by shifting the engaging position for the second end 20b of the energy absorbing member 20 in the direction of arrow A in FIG. 2 to thereby decrease the stroke during winding, or conversely, the energy absorbing region can be increased by shifting the engaging position for the second end 20b of the energy absorbing member 20 in the direction of arrow B in FIG. 2 to thereby increase the stroke during winding. Thus the EA load characteristics can be changed.

As has been described, with the retractor system 1 of the embodiment, the amount of the EA load and the energy absorbing region can easily be changed according to (A) to (C). Thus, the energy absorbing characteristics of the entire retractor system 1 can easily be changed in combination with various forms of energy absorption shared by the torsion bar 5 and the spool 4. This arrangement facilitates optimization of the energy absorbing characteristics according to the difference in vehicle structure in response to recent needs, thereby protecting the body of an occupant sufficiently.

It is needless to say that, in addition to the methods of (A) to (C), varying the material of the energy absorbing member 20 enables the energy absorbing characteristics to be changed freely.

(2) Advantages of Disengagement of Energy Absorbing Member 20

With the retractor system 1 of the embodiment, as has been described with reference to FIG. 6, after the second end 20b of the energy absorbing member 20 comes out of engagement with the large-diameter cylindrical part 4b in the latter stage of collision, and thereafter, no collision energy is absorbed by the energy absorbing member 20. This enables energy absorption only by the plastic deformation of the torsion bar 5 thereafter, as shown in FIG. 7. Accordingly, in addition to the advantages of (1), the amount of the impact energy absorbing load and the energy absorbing region by the entire retractor system 1 can be varied more freely, enabling the optimization more flexibly.

Figure 12:
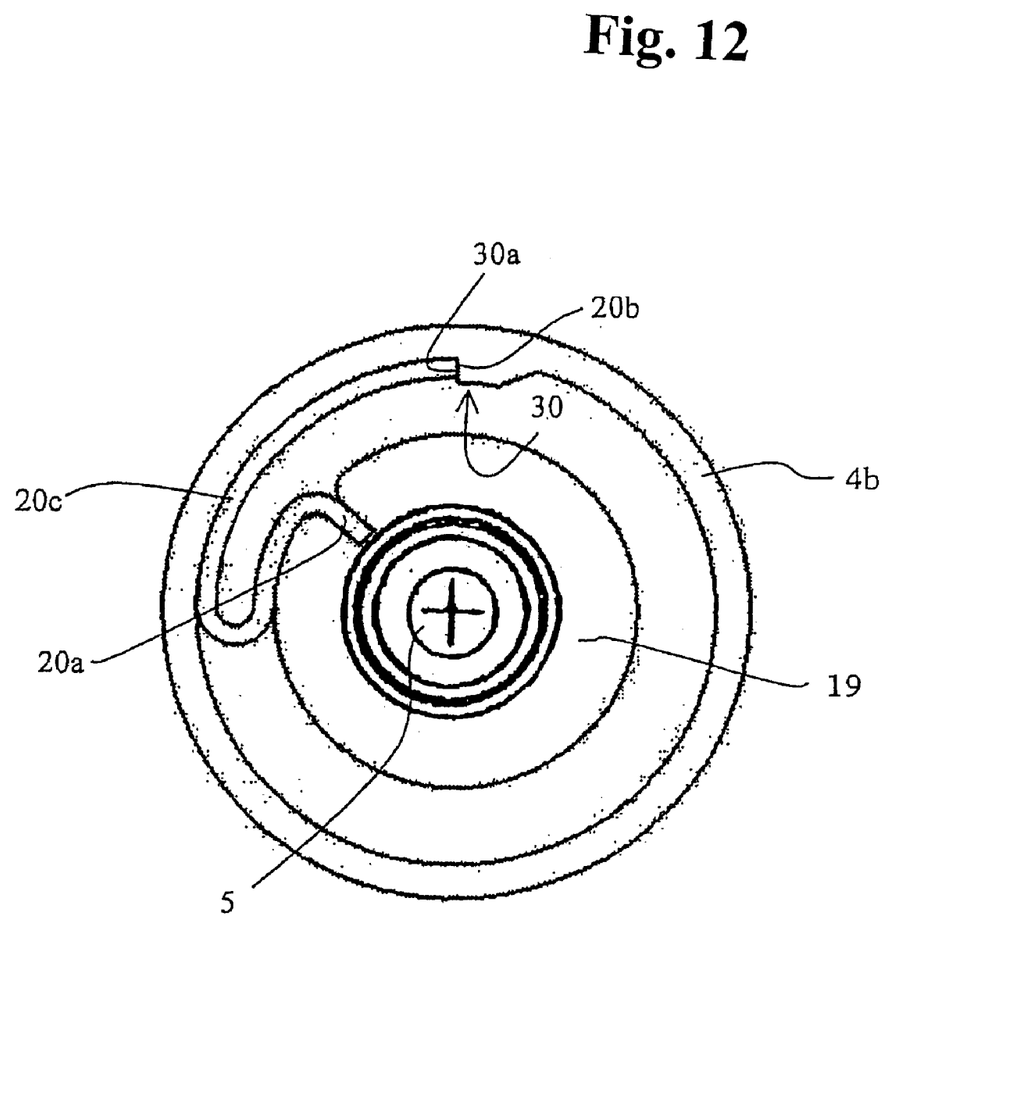
FIG. 12 is a diagram of a modification of an energy absorbing member engaging structure.

From this point of view, as shown in FIG. 12, the large-diameter cylindrical part 4b of the spool 4 may have a projection 30 projecting toward the radial inner periphery, and the end face of the second end 20b of the energy absorbing member 20 may be in contact with the projection 30. In the example of FIG. 12, the second end 20b of the energy absorbing member 20 is not in the substantially L-shaped bent shape, as described above, but in a normal straight end shape.

The projection 30 has a contact end face 30a at one circumferential end (on the left in FIG. 12, in the rotating direction of the spool 4 relative to the torsion bar 5). The end face of the second end 20b of the energy absorbing member 20 is in contact with the end face 30a circumferentially. With this arrangement, upon starting the relative rotation, the end of the second end 20b of the energy absorbing member 20 is pushed in the direction of the relative rotation by the end face 30a, as described before with reference to FIG. 5, and is wound around the outer periphery of the ring 19 in the seatbelt withdrawing direction while being plastically deformed. As the relative rotation advances, the second end 20b is finally separated from the end face 30a to come off the large-diameter cylindrical part 4b.

This arrangement enables the second end 20b of the energy absorbing member 20 to be separated from the large-diameter cylindrical part 4b more smoothly than the case in which the substantially L-shaped second end 20b passes through the spool large-diameter cylindrical part 4b from the inner periphery to the outer periphery shown in FIG. 2. In addition, this arrangement eliminates the subsequent collision energy absorption by the energy absorbing member 20.

Furthermore, the decrease in the energy absorbing load in the latter stage has the following significance.

Specifically, recent vehicles have an SRS airbag system that inflates in an emergency to receive occupant's bodies for protection, thereby improving the safety of the occupants in cooperation with seatbelt systems. With the SRS airbag system, in order to make the most of the SRS system with safety, cooperation of the airbag system and the seatbelt system is made. For example, in the initial stage of collision until the occupant comes in contact with an inflated airbag, a large energy absorbing load is provided to thereby minimize the movement of the occupant, and in the latter stage of the collision when the airbag starts to restrain the occupant, the energy absorbing load is decreased to thereby protect the occupant with the airbag.

The modification, in which the amount of energy absorbing load in the latter stage of collision is decreased as has been described, is suitable for cooperation with the SRS airbag system, preventing an excessive retraining force to be applied from the seatbelt 3 to the occupant by a large load in the latter stage of the collision.

Figure 13A:
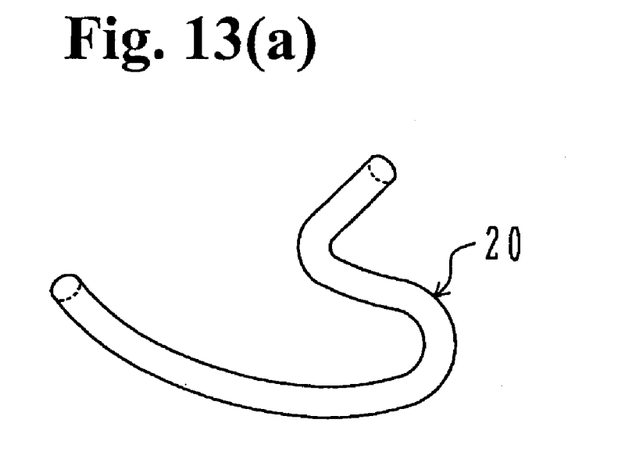
FIGS. 13(a) and 13(b) are perspective views of modifications of the energy absorbing member.
Figure 13B:
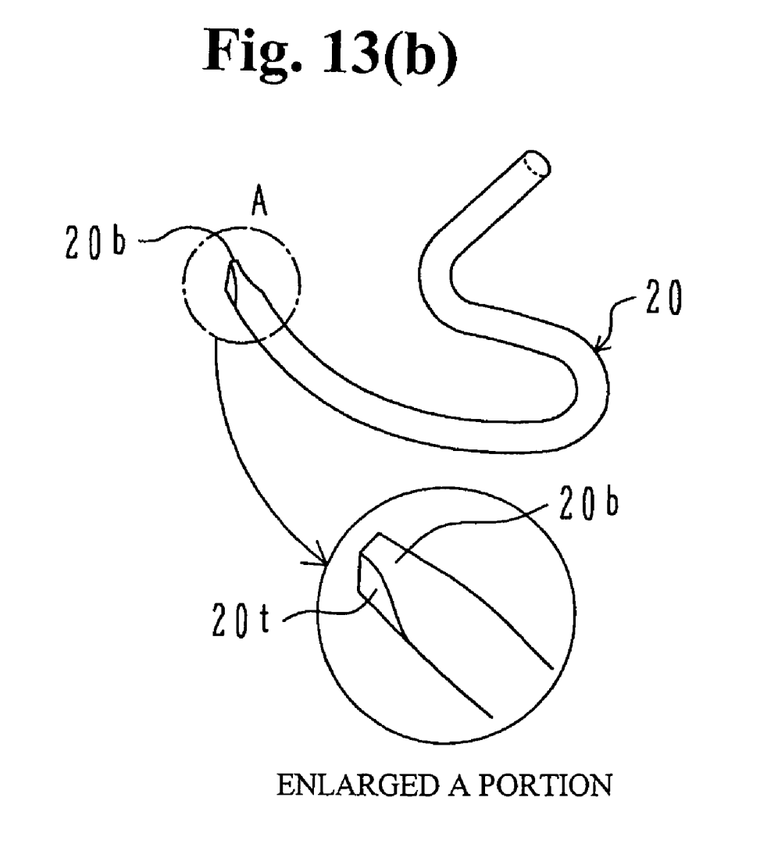

The energy absorbing member 20 of the modification may have a substantially even circular or elliptical cross section from the leading end to the trailing end, as shown in FIG. 13(a). Alternatively, it may have the tapered portion 20t that decreases in thickness gradually closer to the end of the second end 20b, as shown in FIG. 13(b), like the structure shown in FIGS. 10 and 11. (Correspondingly, the width of the second end 20b also decreases substantially.) In this case, the strength of the energy absorbing member 20 is smaller at the tapered portion 20t than at the other part, as in the above. Thus a load necessary for plastic deformation in the latter stage of the plastic deformation becomes smaller than before, thus offering the advantage of making the EA load lower than before.

(3) Reducing Size

The energy absorbing member 20 according to the embodiment has a substantially circular (or substantially flat or substantially elliptical) cross section. This eliminates the necessity for increasing the thickness of the ring 19 or the mounting member, thus reducing the size of the system.

(4) Others

To provide the effects of (1), the retractor system 1 of the embodiment has the ring-shaped space S, for disposing the energy absorbing member 20, between the inner periphery of the large-diameter cylindrical part 4b of the spool 4 at the axial end thereof and the outer periphery of the substantially disc-shaped ring 19. This arrangement prevents an increase in radial length of the part except the position where the ring 19 and the energy absorbing member 20 are disposed, thereby making the system compact.

Figure 14:
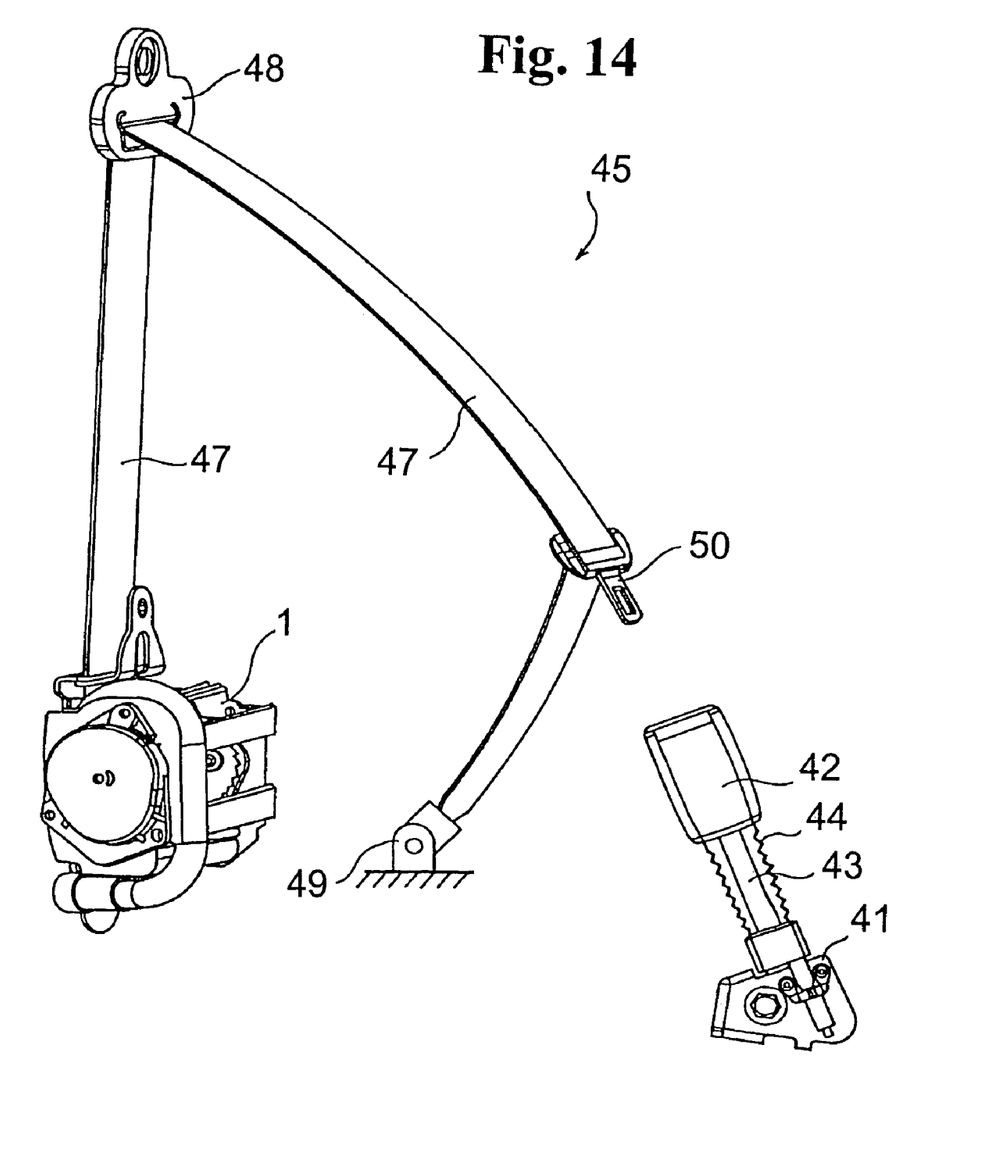
FIG. 14 is a view showing a seat belt device equipped with the seat belt retractor system shown in FIG. 1.

FIG. 14 is a view showing a seat belt device provided with the seat belt retractor system 1 shown in FIG. 1. As shown in FIG. 14, a seat belt device 45 includes the seat belt retractor 1 fixed to a portion of a vehicle body such as a vehicle floor and the like; a belt guide 48 attached to a portion of the vehicle body such as a center pillar and the like for guiding a seat belt 47 extending from the seat belt retractor 1 into a predetermined position relative to an occupant; an anchor 49 fixed to a portion of the vehicle body such as a floor and the like on an outer side of a vehicle seat and to which an end of the seat belt 47 is connected; a tongue 50 slidably supported to the seat belt 47; a buckle 42 fixed to a portion of the vehicle body such as a floor and the like on an inner side of the vehicle seat and to which the tongue 50 can be latched; a buckle supporting member 41 for supporting the buckle 42; a connecting member 43 connecting the buckle supporting member 41 and the buckle 42; and a boot 44 disposed between the buckle 42 and the buckle supporting member 41.

The disclosure of Japanese Patent Application No. 2005-168739 filed on Jun. 8, 2005 is incorporated herewith.

While the invention has been explained with reference to the specific embodiments of the invention, the explanation is illustrative, and the invention is limited only by the appended claims.

What is claimed is:

1. A seatbelt retractor system comprising:
    a substantially cylindrical rotatable member operable to retract a seatbelt;
    a twistable shaft member disposed in an inner periphery of the substantially cylindrical member, and having a first axial end connected to the substantially cylindrical member in such a manner as to rotate therewith and a second axial end;
    a mounting member disposed in the inner periphery of an axial end of the substantially cylindrical member to form an annular space relative to the inner periphery, and connected to an outer periphery of the second axial end of the shaft member in such a manner as to rotate therewith;
    a locking mechanism capable of stopping rotation of the mounting member in a seatbelt withdrawing direction; and
    an energy absorbing member disposed in the annular space and having substantially a rod shape with a smooth curved portion in section, said energy absorbing member including a first end fixed to the outer periphery of the mounting member, a bent portion near the first end and a second end engaging the inner periphery of the axial end of the substantially cylindrical member so that the energy absorbing member extends in one direction from the first end to the bent portion, changes a direction opposite to the one direction at the bent portion and extends to the second end, the energy absorbing member operable to absorb an impact load applied to the seatbelt while changing a location of the bent portion in the energy absorbing member when the locking mechanism is activated.

2. The seatbelt retractor system according to claim 1, wherein said energy absorbing member has a substantially circular cross section.

3. The seatbelt retractor system according to claim 1, wherein said energy absorbing member has a substantially flat cross section with curved corners or a substantially elliptical cross section.

4. The seatbelt retractor system according to claim 1, wherein the energy absorbing member has a flatness or a proportion of a major axis to a minor axis in section to provide desired energy absorbing characteristic.

5. The seatbelt retractor system according to claims 1, wherein the energy absorbing member has a tapered portion that decreases in thickness closer to an end.

6. A seatbelt system comprising:
a seatbelt for restraining an occupant;
the seatbelt retractor system withdrawably retracting one end of the seat belt according to claim 1;
a tongue provided to the seatbelt; and
a buckle unit that comes into engagement with the tongue so that the occupant wears the seatbelt.

7. The seatbelt retractor system according to claim 1, wherein the substantially cylindrical member includes a projection extending radially inwardly from the inner periphery thereof, said projection contacting the second end and pushing the energy absorbing member when the energy absorbing member operates.

8. The seatbelt retractor system according to claim 1, wherein the energy absorbing member substantially contacts the mounting member from the first end to the bent portion, and substantially contacts the inner periphery of the substantially cylindrical member from the bent portion to the second end.

9. The seatbelt retractor system according to claim 3, wherein the energy absorbing member is a rod base material with a substantially circular cross section subjected to flattening.

10. The seatbelt retractor system according to claim 5, wherein the tapered portion of the energy absorbing member is a rod material subjected to flattening.

* * * * *